May 14, 1940.    H. L. MILLS    2,200,632
ARC WELDING SYSTEM
Filed Oct. 11, 1937    2 Sheets-Sheet 1

Inventor
Henry L. Mills
By Caswell & Lagaard

Inventor
Henry L. Mills
By Caswell & Lagaard

Patented May 14, 1940

2,200,632

UNITED STATES PATENT OFFICE 2,200,632

ARC WELDING SYSTEM

Henry L. Mills, Minneapolis, Minn., assignor to Guy L. Pugh, Minneapolis, Minn.

Application October 11, 1937, Serial No. 168,411

2 Claims. (Cl. 171—119)

My invention relates to arc welding systems and has for an object to provide an arc welding system which is extremely practical in operation and highly efficient.

Another object of the invention resides in providing an arc welding system by means of which different values of current may be procured without the use of taps on the welding transformer.

Another object of the invention resides in providing an arc welding system in which practically constant current delivery is procured at the load regardless of the arc voltage.

A still further object of the invention resides in providing an arc welding system for use with alternating current in which a flat top wave form results.

Another object of the invention resides in providing an arc welding system in which control of the current may be procured with a minimum loss of power.

A still further object of the invention resides in providing an arc welding system in which control of the current at the load may be procured from a remote locality and by a small rheostat capable of being carried on the electrode holder.

Another object of the invention resides in providing an electric welding system in which the voltage at the instant of striking the arc is sufficiently high so that positive action results and which immediately becomes reduced to normal once the arc has been struck.

Other objects of the invention reside in the novel combination and arrangement of parts and in the details of construction hereinafter illustrated and/or described.

In carrying out my objects I utilize a reactance consisting of a core having a winding thereon connected in series with one of the windings of the welding transformer and having another winding which is supplied with direct current.

Figure 1:
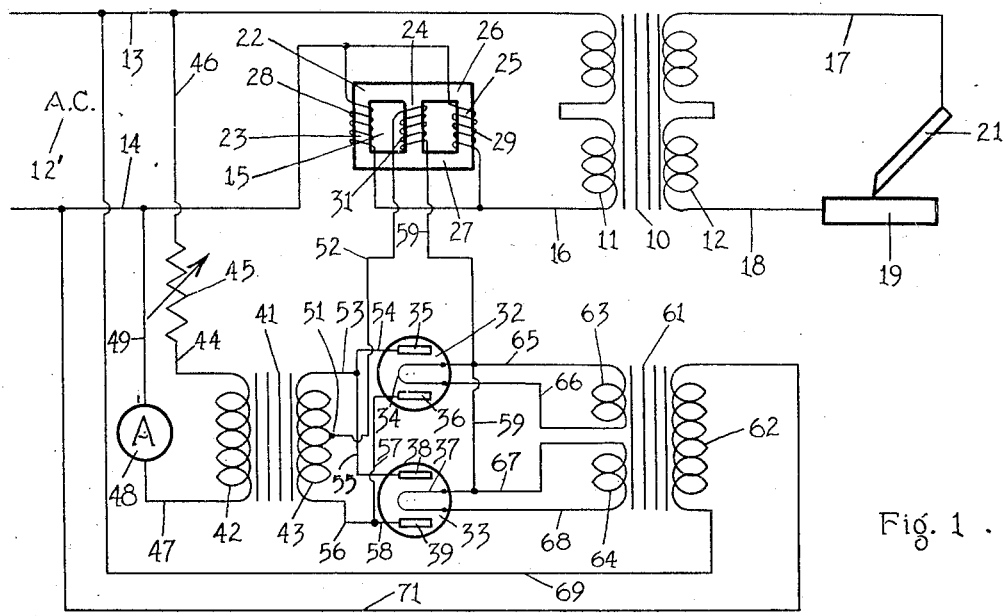
Fig. 1 is a wiring diagram of an arc welding system illustrated in the embodiment of my invention.

My invention, as shown in Fig. 1, comprises a main arc welding transformer 10 which is provided with a primary 11 and a secondary 12. The primary 11 is energized from an alternating current line 12' having leads 13 and 14. The lead 13 is directly connected to the primary 11 while the lead 14 is connected to a special form of reactance 15 which will be presently more fully described. A conductor 16 connects this reactance with the other side of the primary 11. The secondary circuit of the welding transformer 10 comprises two conductors 17 and 18 of which the conductor 18 is connected to the work which is to be welded and which is indicated by the reference numeral 19. The conductor 17 is connected to the electrode which is designated at 21 and which may be a welding rod furnishing the metal for procuring the weld and supported in a suitable holder, or which may be any of the other ordinary forms of electrodes now in use.

The reactance 15 comprises a core 22 which is constructed with three legs 23, 24 and 25, all connected together through end core members 26 and 27. On the legs 23 and 25 of core 22 are provided windings 28 and 29 which are connected in parallel and to the lead 14 of the line 12' and the conductor 16 so that these two windings in parallel are connected in series with the primary 11 of transformer 10. Upon the center leg 24 of core 22 is provided another winding 31 which is supplied with direct current.

For the purpose of energizing the winding 31 two full wave thermionic rectifier tubes 32 and 33 are employed. The tube 32 comprises a filament 34 and two plates 35 and 36. The tube 33 similarly comprises a filament 37 and two plates 38 and 39. These tubes are energized by means of a transformer 41 which comprises a primary 42 and a secondary 43. These various parts are connected as follows. The primary 42 of transformer 41 is connected by means of a conductor 44 to a variable resistance 45. This resistance is connected by means of a conductor 46 to the lead 13 of line 12. The other side of primary 42 of transformer 41 is connected by means of conductor 47 to an ammeter 48 which in turn is connected by a conductor 49 to the lead 14 of line 12'. The secondary 43 of transformer 41 is provided with a center tap 51 which is connected by means of a conductor 52 with one end of the winding 31 on the center leg 24 of the reactance 15. One end of the secondary 43 is connected by conductors 53, 54 and 55 to the two plates 35 and 38 of rectifier tubes 32 and 33. The other end of the secondary 43 is connected by means of conductors 56, 57 and 58 to the other plates 36 and 39 of the two rectifier tubes 32 and 33. The other side of the winding 31 of reactance 15 is connected by means of a conductor 59 with corresponding sides of the two filaments 34 and 37 of the two tubes 32 and 33. It will readily be comprehended that, when the filaments 34 and 37 of said tubes are properly heated, direct current will be furnished to the winding 31 through the conductors 52 and 59.

For the purpose of heating the filaments 34 and 37 of the two rectifier tubes 32 and 33, a transformer, such as indicated at 61, is employed. This transformer comprises a primary 62 and a split secondary having two sections 63 and 64. The section 63 is connected by means of conductors 65 and 66 to the filament 34 of tube 32 while the secondary section 64 is similarly connected by means of conductors 67 and 68 to the filament 37 of tube 33. The primary 62 of transformer 61 is connected by means of two conductors 69 and 71 to the two leads 13 and 14 of line 12'.

In the wiring diagrams illustrating my invention I have not shown any switches or other means for making and breaking the various circuits of the invention. It can, however, be readily comprehended that switches may be inserted in any of the circuits illustrated and wherever found desirable.

The operation of my invention is as follows: If enough direct current is passed through the winding 31 to saturate the core 22 then, when the welding system is in operation, the flux produced by the alternating current flowing through windings 28 and 29 is ineffective and the impedance in the primary circuit is reduced to a minimum. A maximum amount of current can thus flow through the electrode 21 and the work 19. If the direct current passing through winding 31, is reduced to a minimum then the flux produced by windings 28 and 29 alternates in core 22 in accordance with the frequency and wave form of the current in primary 11 of transformer 10 which greatly increases the impedance of reactance 15 and limits the amount of current flowing through the electrode 21 and work 19. In this manner it is possible to vary the out-put of the transformer 10 and to procure any desired current at the arc by merely varying the direct current supplied to the winding 31. This is accomplished in this particular instance by varying the resistance 45 which controls the input to transformer 41 and which in accordance with the customary behavior of rectifier tubes, controls the direct current out-put from the same. With such tubes the heating of the filaments remains constant and merely the voltage across the plates is varied to procure the desired variation in direct current out-put.

In the operation of the transformer, the operator selects the desired current which he wishes to use at the arc and adjusts the variable resistance 45 until the ammeter 48 shows the proper setting. Ammeter 48 may be calibrated to read directly in amperes, the current flowing in the welding arc at the work. Since no current is flowing in the windings 28 and 29 before the arc is struck, the voltage across the electrode 21 and the work 19 is a maximum. This insures positive striking of the arc. As soon as the arc is struck, current flows through the secondary 12 and primary 11 of transformer 10 which likewise flows through the windings 28 and 29 of reactance 15. This increases the impedance of the said reactance which immediately cuts down the voltage of the transformer and likewise the amount of current flowing through the electrode and the work. It will thus readily be apparent that the system automatically cuts down the current once the arc has been struck.

Figure 4:
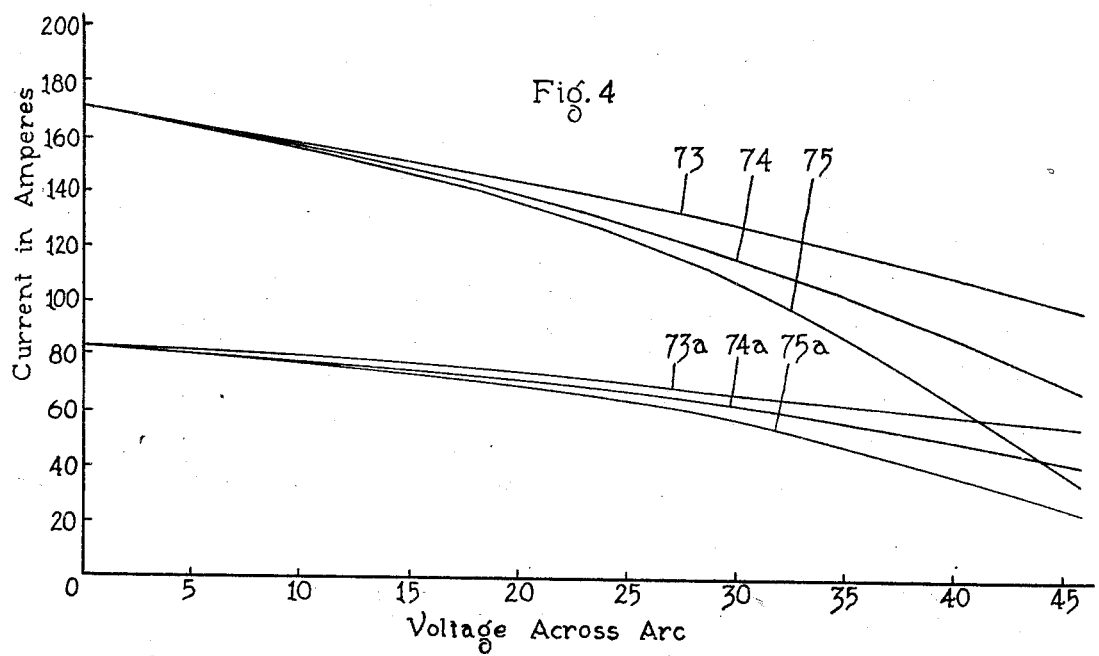
Fig. 4 is a diagrammatic view of a number of curves showing the performance of my improved arc welding system as compared with other systems.

In Fig. 4 I have shown some curves which illustrate the performance of my improved welding system in comparison with the ordinary type of welding systems now in use. These curves are plotted with current values at the arc as ordinates and with voltages across the arc as abscissas. The two sets of curves illustrated have been taken for 170 amperes and for 80 amperes. The curves were procured from actual tests, all using the same welding transformer. Curve 73 shows the performance of a welding system embodying the instant invention with current of 170 amperes. Curve 74 shows a welding system in which an ordinary reactance, not utilizing a direct current winding is employed for regulating the current at the arc. Curve 75 shows the performance of the same transformer when a practically non-inductive resistance is used for controlling the current at the arc. Inasmuch as the voltage at the arc is a function of the length of the arc, it will readily be comprehended that, if the curves were straight horizontal lines, the same amount of current would flow regardless of the length of the arc. This would enable the operator to procure the same flow of metal whether he maintained a long or a short arc thereby enabling the operator to produce better work with less accuracy in maintaining a certain length of arc. From an observation of the three curves it will be found that curve 73, which shows the performance of the instant invention, comes the closest to being a horizontal line. Curves 73—a, 74—a, and 75—a correspond to 73, 74 and 75 and illustrate the variation in voltage when the system is regulated to produce a current of 80 amperes at the arc. These curves are quite similar to the curves previously referred to, excepting that the variation between the three curves is less as the voltage increases. It will thus become apparent that for greater currents the instant invention becomes more efficient which greatly assists in making large welds where it becomes difficult to maintain the exact length of arc. It will readily become apparent that with my invention greatly improved results are obtained over and above systems using an ordinary type of reactance or non-inductive resistance.

Figure 2:
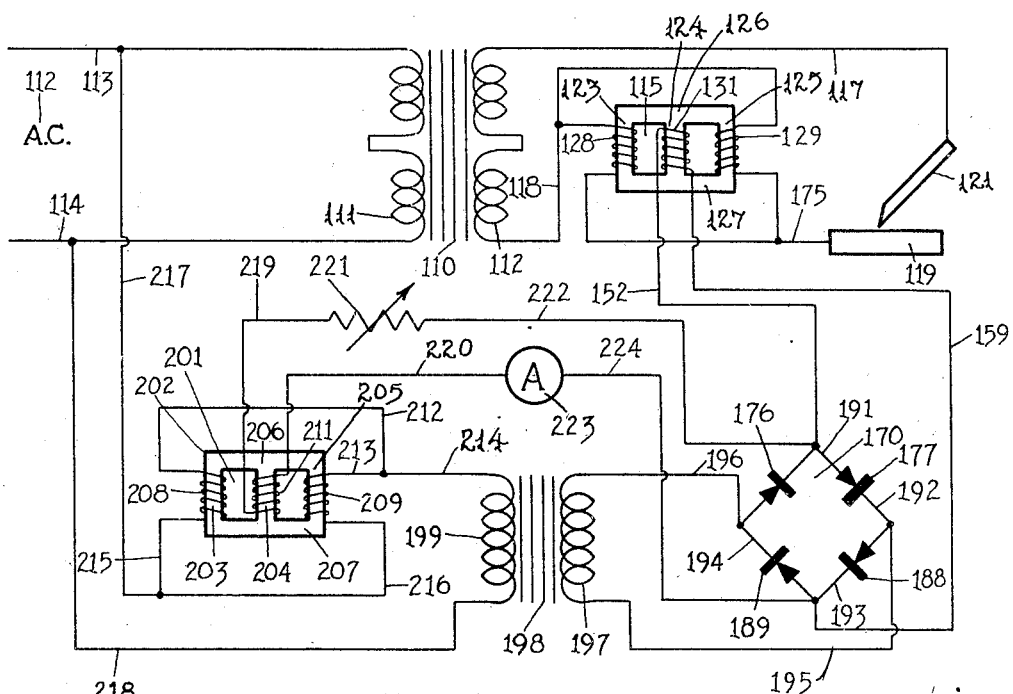
Fig. 2 is a wiring diagram of a modification of the invention.

In Fig. 2 I have shown a modification of the invention where the reactance is placed in the secondary circuit and in which plate rectifiers, such as copper oxide plate rectifiers, are used in place of the thermionic tubes. In this form of the invention another type of control for the direct current has been illustrated. Since certain of the elements in this form of invention are identical with those shown in Fig. 1, the description thereof will not be repeated and similar reference numerals preceded by the digit 1 will be used to indicate corresponding parts.

As in the case of the form of the invention shown in Fig. 1, the windings 128 and 129 of the reactance 115 are connected to the conductor 113 leading from the secondary 112 of transformer 110. These windings are further connected by means of a conductor 175 with the work 119 so that the said windings are in series with the transformer secondary 112 and the arc.

In place of the two thermionic tubes 32 and 33 a bridge rectifier 170 is utilized. This rectifier comprises four plate rectifiers 176, 177, 188 and 189 which are connected together by means of conductors 191, 192, 193 and 194. The two conductors 152 and 159 leading from the winding 131 of reactance 115 are connected to the two conductors 191 and 193 of the bridge. The other two conductors 192 and 194 of the bridge are connected by means of conductors 195 and 196 to the secondary 197 of transformer 198. The primary 199 of this transformer is connected to the leads 113 and 114 of line 112 through another reactance 201 which will now be described in detail.

The reactance 201 is similar to the reactance 115 and is constructed with a core 202 having three legs 203, 204 and 205. These legs are connected together by means of end core members 206 and 207. On the legs 203 and 205 are alternating current windings 208 and 209, while on the center leg 204 is a direct current winding 211. The two windings 208 and 209 are connected together in parallel through conductors 212 and 213 which in turn are connected through a conductor 214 with one side of the primary 199 of transformer 198. The other ends of these windings are connected together by means of conductors 215 and 216, which in turn, are connected by means of a conductor 217 to the lead 113 of line 112. The other end of the primary 199 of transformer 198 is connected by means of a conductor 218 to the other lead 114 of line 112. One end of the winding 211 is connected by means of a conductor 219 with a variable resistance 221, which in turn is connected by means of conductor 222 to the conductor 191 of the bridge rectifier 170. The other end of the winding 211 is connected by means of a conductor 220 to an ammeter 223, which in turn is connected by means of conductor 224 to the conductor 193 of the bridge rectifier 170. By means of the circuit containing these last named conductors direct current is supplied to the winding 211.

The method of operation of the reactance 201 is the same as the reactance 115. When the core 202 is saturated by the flux produced by the direct current flowing in the winding 211, the impedance of the reactance is a minimum and a large amount of direct current is supplied by the bridge rectifier 170 to the winding 131. When the direct current in the winding 211 is reduced through the variable resistance 221, the impedance of the reactance 201 greatly increases and the direct current supplied by bridge rectifier 170 decreases. Thus the current flowing in resistance 221 is small so that an extremely small resistance may be used. I have found by experiments that a small resistance, capable of being carried on the electrode holder of the arc welding system, may be conveniently employed whereby variation in the welding current within the entire range of the welder may be procured. Also ammeter 223 may be sufficiently small to be carried on the electrode holder.

Figure 3:
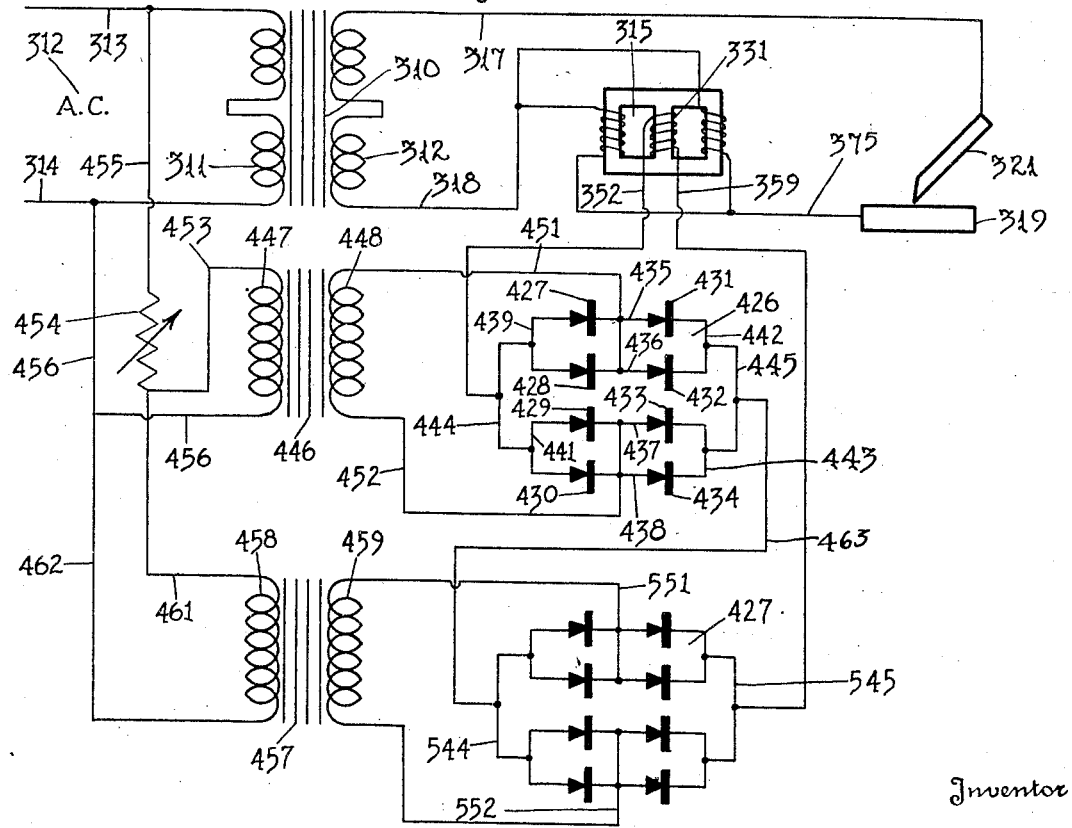
Fig. 3 is a wiring diagram of still another form of the invention.

In Fig. 3 I have shown still another modification of the invention which is similar to that shown in Fig. 2, and in which certain of the elements are identical. The description of these elements will not be repeated and the same reference numerals having a first digit 3 instead of 1 will be used to designate corresponding parts.

In the form of the invention shown in Fig. 3, two banks of rectifiers 426 and 426a are utilized. The bank 426 consists of eight plate rectifiers 427, 428, 429, 430, 431, 432, 433, 434. The rectifiers 427, 428, 429 and 430 are connected to the rectifiers 431, 432, 433, and 434 by means of conductors 435, 436, 437 and 438. The two rectifiers 427 and 428 are connected together by means of a conductor 439. The rectifiers 429 and 430 are connected together by means of a conductor 441. The two rectifiers 431 and 432 are connected by means of a conductor 442, while the rectifiers 433 and 434 are connected by means of a conductor 443. Conductors 439 and 441 are connected together by means of a conductor 444, while conductors 442 and 443 are connected together by means of a conductor 445.

For energizing the bank of rectifiers 426 a transformer 446 is utilized. This transformer comprises a primary 447 and a secondary 448. One end of the secondary 448 of transformer 446 is connected by means of a conductor 451 to both the conductors 435 and 436. The other end of the secondary 448 of this transformer is connected by means of a conductor 452 with both of the conductors 437 and 438. The primary 447 of transformer 446 is connected by a conductor 453 to a variable resistance 454, which in turn is connected by a conductor 455 to the lead 313 of line 312. The other side of the primary 447 of this transformer is connected by means of a conductor 456 to the lead 314 of line 312.

The bank of rectifiers 426a is constructed identically with the bank 426 and is connected up in the same manner. The description thereof will hence not be repeated. This bank includes terminal conductors 551, 552, 544 and 545 which correspond with the conductors 451, 452, 444 and 445 of the bank 426. A transformer 457 is utilized for energizing the rectifiers of bank 426a. This transformer comprises a primary 458 and a secondary 459. The primary 458 of this transformer is connected by means of two conductors 461 and 462 to the conductors 455 and 456 previously referred to. By means of this circuit the two transformers 446 and 457 are connected together in parallel and are controlled by the single resistance 454. The center winding 331 of reactance 315 is connected by means of conductors 352 and 359 to the conductors 444 and 545 respectively. Conductor 445 is connected by another conductor 463 to conductor 544. The two conductors 551 and 552, as with the bank 426 are connected to the secondary 459 of transformer 457. The form of the invention shown in Fig. 3 differs from that shown in Fig. 2 in that a large number of plate rectifiers have been utilized whereby an appreciable amount of current can be procured and the welder used for making large welds. The performance of the systems shown in both Figs. 2 and 3 is similar to the system shown in Fig. 1 and the description thereof will not be repeated.

It will become readily apparent that the special form of reactance used can be inserted either in the primary circuit or in the secondary circuit of the arc welding system. In either case, the performance is substantially the same. Although I have shown two forms of rectifiers for furnishing direct current for the reactance, it can readily be comprehended that any type of apparatus for producing direct current, such as a motor generator set, may be employed. In such case a variable resistance is placed in series with the field coil of the generator for varying the amount of current produced thereby. If a source of direct current is available the same may be directly employed and the voltage thereof controlled by a suitable resistance or otherwise.

In experimenting with my invention I have found that the following values used in conjunction with the various elements shown in Fig. 1 proved very satisfactory. For transformer 10 I have used a core having a cross section of approximately nine square inches, with a primary consisting of two coils, each having 74 turns of $\#7$ wire. The secondary of this transformer comprises two coils, each constructed with 41 turns, each turn consisting of three strands of $\#7$ wire connected in parallel. For the main reactance 15 I have used a core cross section of approximately four and one half square inches. The coils 28 and 29 each consist of 54 turns each constructed with two strands of $\#7$ wire arranged in parallel. The winding 31 consists of 450 turns of $\#12$ wire. Any rectifying system may be used which will produce a current of about 20 amperes.

I have found that, where the particular type of reactance illustrated has been employed, an oscillograph of the wave form shows that the wave peak is substantially horizontal and that the maximum flow of current continues over an exceedingly great portion of the wave cycle. With my invention lesser voltage is required at the arc so that the workman is subjected to less danger.

The advantages of my invention are manifest. By means of the system employed sufficient voltage is available at the outset to procure positive striking of the arc. After the arc has been struck, variations in length of the arc do not appreciably affect the current flowing in the arc so that uniform and smooth welds are procured. Due to the resulting wave form the workmen are subjected to lesser danger and at the same time a smooth arc results. With my improved system the workmen can readily vary the current at the work by merely operating the variable resistance provided instead of by changing taps on the transformer windings as has heretofore been the custom.

Changes in the specific form of my invention, as herein disclosed, may be made within the scope of what is claimed without departing from the spirit of my invention.

Having described my invention, what I claim as new and desire to protect by Letters Patent is:

1. In an arc welding system, a transformer having a primary winding and a secondary winding, a reactance having a core formed with three legs, windings on the outer legs of the core connected in parallel with one another and in series with one of said transformer windings, another winding on the intermediate leg of the core, a rectifier connected to said last named reactor winding, a second transformer having a primary winding and a secondary winding, said secondary winding being connected to said rectifier, another reactance having a core with three legs, windings on the outer legs of said core connected to one of the windings of the second named transformer, a winding on the intermediate leg connected to said rectifier and means for varying the current flowing through the last named winding of the second named reactance.

2. In an arc welding system, a transformer having a primary and a secondary winding, a saturable core variable reactor connected to one of said windings, said reactor including a winding, a circuit for energizing said winding, a second saturable core variable reactor controlling the supply of direct current to the winding of said first reactor and controlling the current in said circuit and means for varying the saturation of said second variable reactor.

HENRY L. MILLS.